US008761147B2

(12) United States Patent
Sun et al.

(10) Patent No.: US 8,761,147 B2
(45) Date of Patent: Jun. 24, 2014

(54) SELECTIVE PROTECTION BASED ON SEQUENCE NUMBERS IN COEXISTING NETWORKS

(75) Inventors: Yanjun Sun, Richardson, TX (US); Ariton E. Xhafa, Plano, TX (US); Ramanuja Vedantham, Allen, TX (US); Josef Peery, Kadima, IL (US); Assaf Sella, Rishpon, IL (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 221 days.

(21) Appl. No.: 13/351,846

(22) Filed: Jan. 17, 2012

(65) Prior Publication Data
US 2012/0184330 A1    Jul. 19, 2012

Related U.S. Application Data

(60) Provisional application No. 61/433,359, filed on Jan. 17, 2011.

(51) Int. Cl.
*H04L 1/16* (2006.01)
*H04L 12/56* (2006.01)
*H04L 1/18* (2006.01)

(52) U.S. Cl.
CPC .............. *H04L 1/1809* (2013.01); *H04L 47/34* (2013.01)
USPC ............ 370/347; 370/394; 370/252; 370/235

(58) Field of Classification Search
CPC ... H04L 1/1809; H04L 1/1848; H04L 1/1841; H04L 1/1858; H04L 1/1635; H04L 1/1854; H04L 29/06; H04L 47/34; H04L 69/16

USPC ......... 370/345–347, 428, 443, 235, 338, 312, 370/394; 714/710–712, 746–748; 725/86, 725/90

See application file for complete search history.

(56) References Cited

U.S. PATENT DOCUMENTS

| | | | | |
|---|---|---|---|---|
| 5,889,772 A * | 3/1999 | Fischer et al. | ................. | 370/346 |
| 6,757,248 B1 * | 6/2004 | Li et al. | .......................... | 370/235 |
| 6,850,769 B2 * | 2/2005 | Grob et al. | .................... | 455/515 |
| 6,980,514 B2 * | 12/2005 | Grob et al. | .................... | 370/230 |
| 7,051,358 B2 * | 5/2006 | Hakenberg et al. | ........... | 725/114 |
| 7,373,135 B2 * | 5/2008 | Sugaya et al. | ................ | 455/403 |
| 8,045,514 B2 * | 10/2011 | Song et al. | .................... | 370/329 |
| 8,503,451 B2 * | 8/2013 | Mallory | ........................ | 370/394 |
| 2002/0041596 A1 * | 4/2002 | Rezaiifar et al. | .............. | 370/394 |
| 2003/0174707 A1 * | 9/2003 | Grob et al. | .................... | 370/394 |
| 2005/0144643 A1 * | 6/2005 | Hakenberg et al. | ............. | 725/86 |

FOREIGN PATENT DOCUMENTS

EP         1851863 A1 *  11/2007    ............. H04L 12/28

* cited by examiner

*Primary Examiner* — Dang Ton
*Assistant Examiner* — Sai Aung
(74) *Attorney, Agent, or Firm* — Steven A. Shaw; Wade James Brady, III; Frederick J. Telecky, Jr.

(57) ABSTRACT

A wireless device comprises a first wireless transceiver, a second wireless transceiver, and control logic. The control logic is coupled to the first wireless transceiver and the second wireless transceiver. The control logic is configured to determine whether to transmit protection frames (e.g., clear-to-send 2 self frames) based upon sequence numbers in frames received from another device.

18 Claims, 2 Drawing Sheets

SELECTIVE PROTECTION BASED ON SEQUENCE NUMBERS IN COEXISTING NETWORKS

CROSS-REFERENCE TO RELATED APPLICATION

The present application claims priority to U.S. Provisional Patent Application No. 61/433,359, filed on Jan. 17, 2011; which is hereby incorporated herein by reference.

BACKGROUND

As wireless technologies proliferate, mobile wireless devices incorporate a multiplicity of different wireless standards. For example, a cellular telephone can accommodate a cellular network (e.g., Universal Mobile Telecommunications System), a wireless local area network ("WLAN"), such as IEEE 802.11, and a wireless personal area network ("WPAN") (e.g., BLUETOOTH). Including WPAN access makes utilization of a wireless device more convenient by allowing use of wireless headsets and other short-range wireless appliances. Such phones are sometimes referred to as "smart phones."

Mobile wireless devices are sometimes capable of accessing multiple exclusive wireless networks. Such wireless networks can occupy adjacent or overlapping parts of the frequency spectrum. For example, both BLUETOOTH and IEEE 802.11b/g/n utilize the 2.4-2.5 GHz band. Access to the networks can be coordinated via time multiplexing or frequency multiplexing to reduce performance degradation caused by collisions that may occur when the networks are simultaneously accessed. However, such multiplexing is often at the cost of shorter medium time available to each radio and thus lower performance, as a radio may be blocked from transmitting or receiving packets temporally to avoid collisions.

One technique to coordinate the use of the wireless medium between different wireless protocols that may interfere with each other is through the use of a frame such as the CTS-2-Self (C2S) frame (CTS stands for Clear To Send). A C2S frame commands all other wireless stations on a wireless local area network (WLAN) that receive the C2S frame to avoid transmitting on the wireless network for a period of time indicated in the C2S frame itself. A C2S frame thus places a WLAN in a non-communication mode. Repeated transmissions of C2S frames therefore reduce the performance of a WLAN.

SUMMARY

Various embodiments are described herein in which C2S frame transmission is selectively enabled and disabled based on wireless frame sequence numbers. For example, one embodiment is directed to a wireless device that comprises a first wireless transceiver, a second wireless transceiver, and control logic coupled to the first and second wireless transceivers. The control logic disables transmission of clear-to-send 2 self (C2S) frames upon determining that more than a threshold period of time has elapsed without detecting any missing sequence numbers in wireless frames or upon determining that more than a threshold number of wireless frames have been received without a missing sequence number.

Another embodiment is directed to a wireless device that comprises a first wireless transceiver, a second wireless transceiver, and control logic that is coupled to the first and second wireless transceivers. The control logic enables transmission of clear-to-send 2 self (C2S) frames upon determining that a sequence number for a wireless frame has been missed.

A disclosed method embodiment is directed to a method that includes receiving a wireless frame that contains a sequence number. The method further includes, based on the sequence number, determining whether a sequence number has been missed, and also includes enabling transmission of clear-to-send 2 self (C2S) frames based on a determination that a sequence number has been missed.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
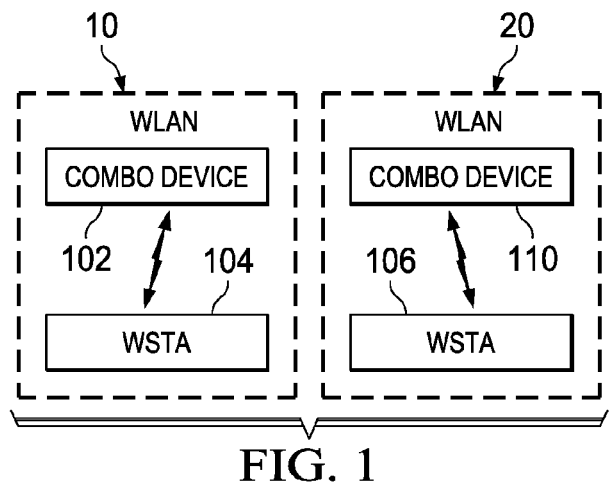
FIG. 1 illustrates a situation in which it may or may not be desirable for a wireless combo device to issue a C2S frame.

FIG. 1 illustrates two wireless networks (WLAN) 10 and 20. Each WLAN may be compliant with the one of the IEEE 802.11x family of wireless standards, or may be compliant with some other wireless standards. In the example of FIG. 1, WLAN 10 includes a "combo device" 102 in wireless communication with a wireless station (WSTA) 104. In this disclosure, a combo device is a device that is capable of sending and/or receiving wireless communications for different wireless protocols. For example, a combo device may have a WiFi transceiver (compliant with IEEE 802.11x) for sending and receiving communications on a WLAN, and a BLUETOOTH transceiver for sending and receiving BLUETOOTH communications. A combo device may switch between WiFi and BLUETOOTH communication modes, for example, sending a BLUETOOTH communication for a brief period of time and then sending a WiFi packet, returning to the BLUETOOTH mode, and so on. WLAN 20 also includes a combo device 110 in wireless communication (WiFi) with WSTA 106. In some embodiments, each of the WSTAs 104, 106 may only be capable of WiFi communications, but in other embodiments, either or both of WSTAs 104, 106 may be combo devices themselves.

A combo device (e.g., 102, 110) is capable of functioning as a WiFi access point (AP). Thus, in the example of FIG. 1, for WLAN 10 combo device 102 may function as an AP to exchange WiFi packets with WSTA 104. Similarly, for WLAN 20 combo device 110 may function as an AP to exchange WiFi packets with WSTA 106. Thus, each combo device is capable of repeatedly switching between a WiFi mode in which the combo device functions as an AP, and BLUETOOTH mode in which the combo device sends/receives BLUETOOTH communications.

In one illustrative use scenario, each of combo devices 102, 110 may comprise a smart phone that switches between WiFi mode to function as a WiFi AP and BLUETOOTH mode in which a battery operated BLUETOOTH earpiece worn by a user receives BLUETOOTH communications from the combo device. The combo device (e.g., smart phone) may have a BLUETOOTH communication link to the user's earpiece over which the combo device sends wireless packets of audio (e.g., music) or wireless packets of a phone conversation. As such, the combo device may enable a user to listen to music or have a phone conversation over a BLUETOOTH link while concurrently functioning as a WiFi AP in a WLAN.

The BLUETOOTH frequency spectrum lies partially or fully within the spectrum allocated for WiFi communications. Therefore, many a combo device typically broadcasts a C2S frame upon temporary entrance into the BLUETOOTH mode. The C2S frame includes a time period during which all WSTAs and APs receiving the C2S frame are to avoid transmission of WiFi frames. Cessation of WiFi frames when one or more of the WSTAs are in a BLUETOOTH mode avoids interference between BLUETOOTH and WiFi transmissions on, for example, the same device. That is, due to the close proximity of a BLUETOOTH transceiver and a WiFi transceiver in the same combo device, any BLUETOOTH transmission transmitted by the BLUETOOTH transceiver in the combo device will likely saturate the combo device's WiFi transceiver thereby precluding successful reception of WiFi packets during the combo device's BLUETOOTH transmissions. Thus, combo devices typically transmit a C2S frame to preclude WiFi transmissions during the combo device's BLUETOOTH mode. A BLUETOOTH transmission may also saturate a WiFi transceiver in a different WiFi-enable device preventing such other WiFi-enabled device from correctly receiving WiFi packets.

However, it is recognized that a combo device need not always transmit a C2S frame. For example, it may be the case that no other WiFi-enabled devices need to transmit WiFi packets during the combo device's BLUETOOTH transmissions anyway. Further, it may be the case that another WLAN within range of the combo device's own WLAN may be close enough to receive the combo device's C2S frames, yet far away enough that any BLUETOOTH communications (which are typically of lower signal strength than WiFi communications) emitted by the combo device would not saturate a WiFi transceiver of a device in the nearby WLAN. For example, WLAN 20 may be close enough to WLAN 10 so as to receive and decode a C2S frame emitted by combo device 102 in WLAN 10, but far away enough that combo device 102's BLUETOOTH transmissions are of such low amplitude at the location of the devices in WLAN 20 that WLAN 20 can successfully engage in WiFi communications. So, WSTA 104 may not need to transmit a WiFi frame during the combo device 102's BLUETOOTH mode and the devices of WLAN 20 would not be rendered useless, due to their distance from combo device 102, for transmissions of WiFi packets.

Further still, even if an incoming WiFi packet fails to be correctly received and decoded due to BLUETOOTH transmissions, packet retry functionality inherent in WiFi protocols at the media access control (MAC) or higher network layer may cause the WiFi packet ultimately to be successfully transmitted and received. The following description explains how the system determines when a combo device is to send C2S frames when transitioning between WiFi and BLUETOOTH communication modes, and when not to send C2s frames. Avoiding transmissions of C2S frames when C2S frames would typically be transmitted, but in fact are not needed, improves network performance. The principles discussed herein thereby provide selective protection of coexistence networks (networks with multiple types of wireless protocols). Further, the principles discussed herein apply to any type of protection frame, not just C2S frames.

Figure 2:
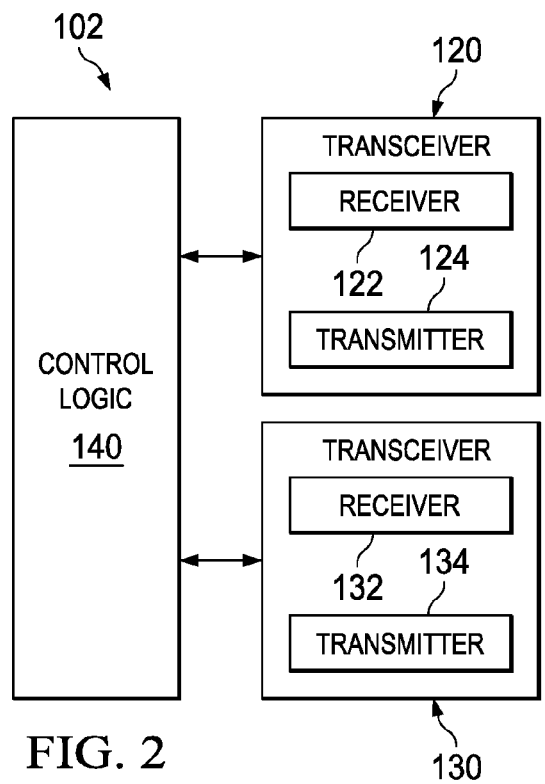
FIG. 2 shows a block diagram of a wireless station in accordance with various embodiments of the invention.

FIG. 2 illustrates a system diagram of combo device 102, although the system diagram of FIG. 2 applies to any combo device (e.g., combo device 110). Combo device 102 includes two wireless transceivers 120 and 130 and may have more than two transceivers as desired. Each wireless transceiver 120, 130 sends and receives wireless communications in accordance with a specified wireless protocol. For example, wireless transceiver 120 may be capable of sending and receiving BLUETOOTH transmissions, while wireless transceiver 130 may be capable of sending and receiving WiFi frames. Each transceiver has a receiver and a transmitter. Transceiver 120 includes a receiver 122 and a transmitter 124. Transceiver 130 also includes a receiver 132 and a transmitter 134.

Both transceivers 120, 130 are coupled to control logic 140 which coordinates the operation of the wireless transceivers 120, 130. In some embodiments, the control logic 140 time multiplexes the use of the wireless medium between the various transmitters 124 and 134. Thus, when the control logic 140 causes transmitter 124 to transmit, for example, a BLUETOOTH transmission, the control logic 140 does not cause transmitter 134 to transmit any communications (e.g., WiFi frames).

Figure 3:
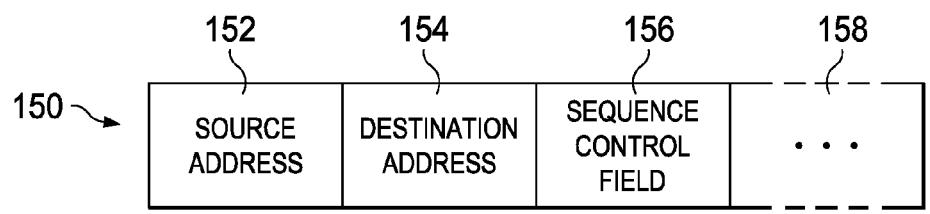
FIG. 3 illustrates a header of a wireless frame.

The control logic 140 also may implement a network protocol stack such as the Open Systems Interconnection (OSI) model. The control logic 140 receives incoming wireless transmissions from the receivers 122, 132 and decodes the incoming transmissions. A WiFi frame may include MAC frame formatted as shown in FIG. 3. The control logic 140 generates the frame for outgoing transmissions and parses incoming frames to decode the information contained therein. The illustrative frame format 150 of FIG. 3 may include a source address field 152, a destination address field 154, a sequence control field 156, and one or more additional fields 158 such as a frame body, a frame check sequence, etc. The source address field 152 specifies the address of the device that generated the frame, while the destination address field 154 specifies the address of the device to which the frame is targeted.

The sequence control field 156 specifies a sequence number. The sequence number is specified for each frame. The sequence number is incremented with each successive frame transmitted by a WiFi-enable device (e.g., WSTA or combo device). For a retransmission of a frame, the sequence number remains the same. The sequence number may be incremented by 1 in at least some embodiments. For example, if WSTA 102 sends 10 WiFi packets, the first WiFi packet may be assigned a sequence number of 0 and the successive nine packets are numbered 1 through 9 in order. In some embodiments, once the sequence number reaches a particular terminal value, it "wraps around" back to 0. For example, the sequence number may be specified in a 12-bit field and thus once the sequence number reaches 4095, the next increment changes the sequence number to 0 and it increments from there. In some WSTAs, the sequence number wraps around to 0 at a terminal value different than 4095 (e.g., 4090).

The combo device (e.g., the control logic 140) is able to dynamically enable and disable transmission of C2S frames. In some situations, the control logic 140 enables transmission of C2S frames upon entering into the BLUETOOTH mode in which the BLUETOOTH's transceiver is to be used. In other situations, the control logic 140 disables transmission of C2S frames upon entering into the BLUETOOTH mode. As explained below, the control logic 140 determines whether to enable and disable transmission of C2S frames based on the sequence number of received WiFi frames. In accordance with a preferred embodiment, a combo device that is capable of wireless communications in accordance with two different protocols (e.g., BLUETOOTH and WiFi) defaults to a mode in which C2S frames are not transmitted upon transitioning from the WiFi to the BLUETOOTH transmission mode in which BLUETOOTH transmissions are to occur. The combo device continues not to transmit C2S frames until the WSTA (e.g., the control logic 140) determines that C2S frames are needed and that determination is made upon examination of the sequence number included in the sequence control field 156 of each received WiFi frame.

Figure 4:
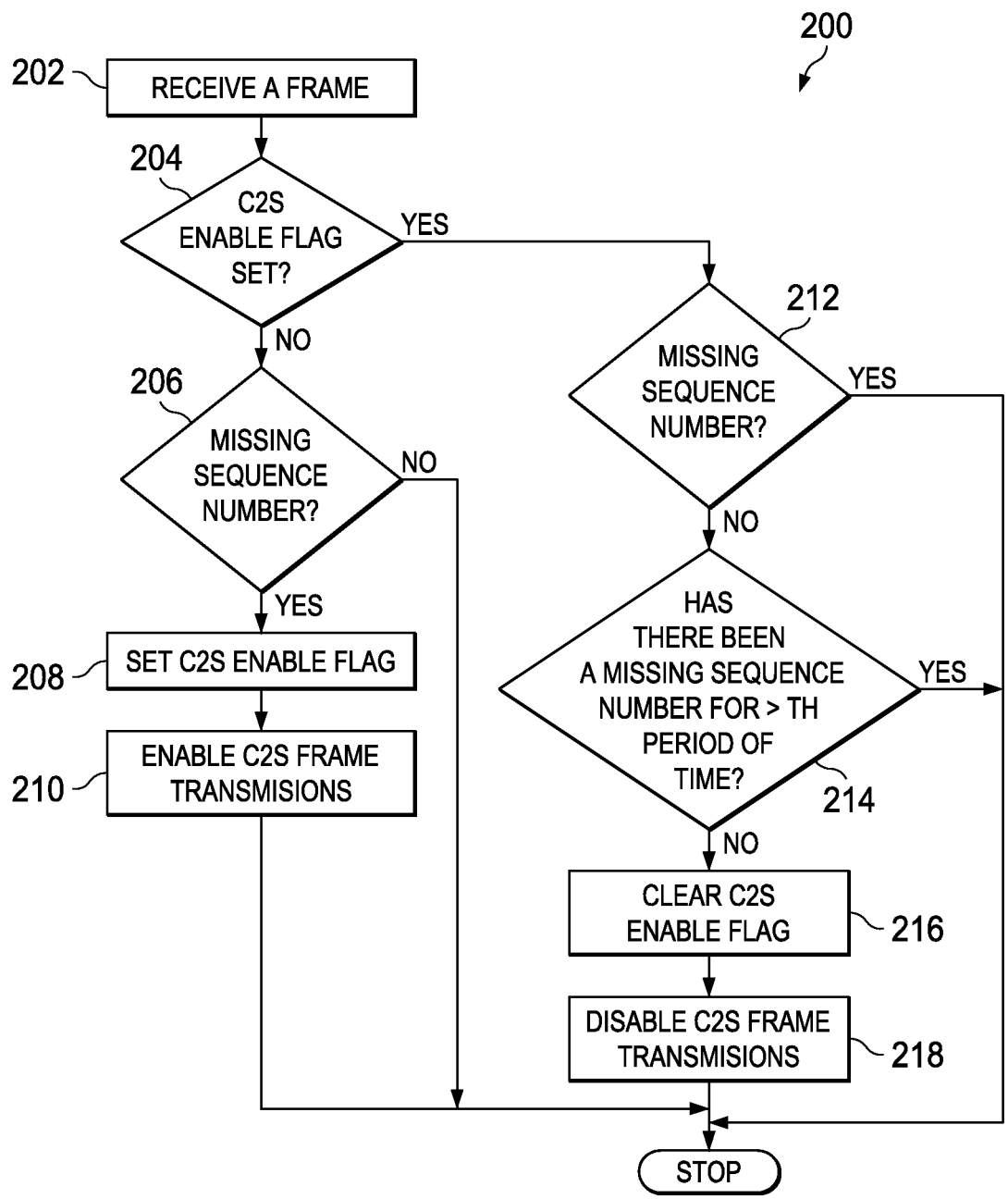
FIG. 4 illustrates a method in accordance with various embodiments of the invention.

FIG. 4 illustrates an example of a method 200 by which C2S frame transmission is enabled and disabled based on the sequence number of received WiFi frames. The method 200 of FIG. 4 is one example of an implementation of the principle noted above and other implementations are possible as well. Various of the actions can be performed in the order shown or in a different order. A C2S enable flag is referenced in method 200. The C2S enable flag is a field (e.g., a bit in a register in the control logic 140) that specifies whether C2S frames are, or are not, to be transmitted upon entrance into the BLUETOOTH transmission mode. In the implementation described in FIG. 4, setting the C2S enable flag means that the C2S frames are to be transmitted, while clearing the C2S enable flag means that C2S frames are not to be transmitted. The flag may be initialized (set or clear) as desired upon system initialization.

Method 200 is performed by a given combo device. At 202, a WiFi frame is received by the combo device. The present state of the C2S enable flag is examined at 204. If the C2S enable flag is not set (i.e., is clear), which indicates that no C2S frames are being transmitted by the combo device, then at 206, the combo device examines the sequence number in the sequence control field 156. The combo device records the last sequence number received in a preceding received WiFi frame and compares that to the current sequence number. The current sequence number should be only 1 greater than the last sequence number received (except for the wrap-around situation discussed above). If the combo device determines that the current sequence number is more than 1 greater than the previously received sequence number (except from the wrap-around situation), then the combo device determines that a sequence number is missing (206). If no sequence number is missing, then no WiFi frames have been missed/dropped and the method stops.

However, a missing sequence number indicates that a WiFi frame (having the missing sequence number) has been dropped. Dropping a WiFi frame may have occurred because, for example, the combo device was sending/receiving BLUETOOTH packets while a nearby WLAN was attempting to transmit a WiFi frame and the combo device did not successfully receive the WiFi frame. In some embodiments, upon not receiving an acknowledgment, the peer WLAN device may have attempted to automatically retry the WiFi frame a predetermined number of times. Upon still not receiving an acknowledgment, the peer WLAN device may have skipped ahead to the next WiFi frame and incremented the sequence number accordingly.

If the combo device detects a missing sequence number, then that indicates that the combo device's BLUETOOTH transmissions are interfering with successful WiFi frame transmissions and thus the combo device should begin transmitting C2S frames to avoid possible avalanche effect of the WLAN in the future. Accordingly, the combo device sets the C2S enable flag at 208 and enables C2S frame transmissions for all future transitions from WiFi to BLUETOOTH transmission modes.

Returning to 204, if the C2S enable flag is set (which indicates that WiFi frames have been dropped thereby previously prompting the combo device to enable C2S frame transmissions), then at 212 the combo device determines if a sequence number is missing between the currently received WiFi frame and a previously received WiFi frame. If a sequence number indeed is missing, then the method stops. If, however, a sequence number is not missing, then it is possible that the combo device can stop transmitting C2S frame. In some embodiments, upon detection of a single instance that a sequence number has not been missed, the C2S enable flag is cleared and C2S frame transmission is disabled. However, in the embodiment of FIG. 4, decision 214 determines whether there has been any missing sequence numbers for a threshold (TH) period of time. In this embodiment, C2S frame transmission is disabled only if at least a threshold period of time has elapsed during which no sequence numbers have been missed, thereby indicating that is safe to discontinue transmitting C2S frames. The time threshold may be any desired period of time and may be configurable. An example of a time threshold is 30 seconds. If the threshold period of time has elapsed without any missing sequence numbers, then at 216, the C2S enable flag is cleared and at 218, C2S frame transmission is disabled. Additionally, or alternatively, the threshold may be based on a number of frames successfully received without detecting a missing frame. For example, if 30 frames with continuous sequence numbers are successfully received, then C2S enable flag is cleared and 218, C2S frame transmission is disabled.

In some embodiments, the sequence numbers are incremented by a value of 1, but the increment can be more than 1 in other embodiments. Accordingly, the determinations of missing sequence numbers (206, 212) takes into account the normal increment value.

Further, the determinations of missing sequence numbers also takes into account the wrap around point as noted above. As noted above, the terminal sequence number value at which the sequence number reverts back to 0 may vary from device to device. For example, some WSTAs may permit the sequence number to reach 4095 before wrapping around to 0, while other WSTAs may wrap around once the sequence number reaches 4090. Initially (e.g., on device power-on and/or initialization), the WSTA automatically enables C2S frame transmission once the sequence number reaches a predetermined value that preferably is safely below the lowest expected terminal sequence value. For example, if it is believed that 4090 is the lowest sequence number value which may cause the associated WSTA to revert back to 0, then the combo device implementing the techniques described herein may use, for example, 4090 or a lower value, to automatically cause C2S frames to be transmitted upon entering BLUETOOTH mode. Once the sequence number resets to, for example, 0 the WSTA again determines whether to transmit C2S frames in accordance with method 200 in FIG. 4.

The combo device continues to receive WiFi frames and examines the sequence numbers in such frames and eventually determines the actual terminal sequence number values. Once the combo device knows that the actual terminal sequence numbers are, for example, 4095, then the combo device ceases automatically transmitting C2S frames upon the sequence number reaching the aforementioned predetermined value (e.g., 4090) and operates in accordance with the method of FIG. 4. Once the sequence number actually reaches the now-known terminal value (e.g., 4095), the combo device expects the next sequence number to be 0 and accordingly determines if a sequence number is missing. C2S frame transmission is disabled at the wrapping around point when the same terminal sequence number value is repeatedly observed (e.g., observed for at least five times).

The sequence number is incremented by each WSTA and AP that transmits a WiFi frame. The sequence number may be different between different WSTAs and APs. Thus, in some embodiments, the determinations by a given WSTA of missing sequence numbers in received WIFi frames are made with respect to individual other WSTAs and APs that transmit such WiFi frames. As such, the WSTA determining whether to enable or disable its C2S frame transmission maintains a record of the last sequence number received in a WiFi frame from all other WSTAs and APs on the WIFi LAN.

It is possible that with A-MPDU in IEEE 802.11n, WiFi packets could be transmitted out-of-order in a short time window. The techniques described herein do not immediately treat such out-of-order transmission as missing MAC sequence numbers. Instead, the algorithm waits until more information from a device or a timeout indicates that jumps in sequence numbers will not be filled in by future WiFi packets.

It should also be understood that the principles described herein are not limited to just protecting WLANs from BLUETOOTH transmissions. The techniques apply to protecting a different radio transceiver or protocol (e.g., IEEE 802.15.4 radio) of a combo device in which the sequence number can be used to detect missing frames.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A combo wireless device, comprising:
a first wireless transceiver configured to send and receive wireless communications in accordance with a first wireless protocol;
a second wireless transceiver configured to send and receive wireless communications in accordance with a second wireless protocol, said second wireless protocol coexisting with said first wireless protocol;
a control logic coupled to and coordinates the operation of said first and second wireless transceivers,
wherein said control logic determines whether to transmit clear-to-send 2 self (C2S) frames based upon media access control (MAC) sequence numbers in frames received from another device, the control logic dynamically enables and disables transmission of C2S frames,
clears an enable flag and coordinates beginning transmitting clear-to-send 2 self (C2S) frames upon determining that more than a threshold period of time has elapsed without detecting any missing MAC sequence numbers in wireless frames or upon determining that more than a threshold number of wireless frames have been received without a missing MAC sequence number.

2. The combo wireless device of claim 1 wherein, after disabling clear-to-send 2 self (C2S) frame transmission, said control logic enables protection frame transmission upon detecting a predefined number of missing MAC sequence numbers in a wireless frame.

3. The combo wireless device of claim 2 wherein said predefined number is 1.

4. The combo wireless device of claim 1 wherein said control logic sets an enable flag upon detecting a missing MAC sequence number in a wireless frame.

5. The combo wireless device of claim 1 wherein, upon receiving a frame with a MAC sequence number at a predefined MAC sequence number threshold, said control logic automatically enables clear-to-send 2 self (C2S) frame transmission.

6. The combo wireless device of claim 5 wherein the predefined MAC sequence number threshold is the maximum permitted MAC sequence number after which the MAC sequence number resets to 0.

7. The combo wireless device of claim 5 wherein the control logic ceases automatically enabling clear-to-send 2 self (C2S) frame transmission upon determining a maximum permitted MAC sequence number value.

8. The combo wireless device of claim 1 wherein the first wireless transceiver is a BLUETOOTH transceiver and the second wireless transceiver is a wireless local area network (WLAN) transceiver.

9. A combo wireless device, comprising:
a first wireless transceiver configured to send and receive wireless communications in accordance with a first wireless protocol;
a second wireless transceiver configured to send and receive wireless communications in accordance with a second wireless protocol, said second wireless protocol coexisting with said first wireless protocol;
a control logic coupled to and coordinates the operation of said first and second wireless transceivers,
wherein said control logic disables transmission of clear-to-send 2 self (C2S) frames upon determining that more than a threshold period of time has elapsed without detecting any missing media access control (MAC) sequence numbers in wireless frames or upon determining that more than a threshold number of wireless frames have been received without a missing MAC sequence number, and
clears a C2S enable flag upon determining that more than a threshold period of time has elapsed without detecting any missing MAC sequence numbers in wireless frames or upon determining that more than a threshold number of wireless frames have been received without a missing MAC sequence number.

10. The combo wireless device of claim 9 wherein, after disabling C2S frame transmission, said control logic enables C2S frame transmission upon detecting a missing MAC sequence number in a wireless frame.

11. The combo wireless device of claim 10 wherein said control logic also sets a C2S enable flag upon detecting a missing MAC sequence number in a wireless frame.

12. The combo wireless device of claim 9 wherein, upon receiving a frame with a MAC sequence number at a predefined MAC sequence number threshold, said control logic automatically enables C2S frame transmission.

13. The combo wireless device of claim 12 wherein the predefined MAC sequence number threshold is the maximum permitted MAC sequence number after which the MAC sequence number resets to 0.

14. The combo wireless device of claim 12 wherein the control logic ceases automatically enabling C2S frame transmission upon determining a maximum permitted MAC sequence number value.

15. A method for selective protection of combo devices in coexisting networks, comprising:
receiving a plurality of wireless frames in accordance with wireless protocols by a combo device, said wireless frames may contain or may be missing a media access control (MAC) sequence number;

determining to begin transmitting clear-to-send 2 self (C2S) frames based upon said MAC sequence number in wireless frames;

clearing a clear-to-send 2 self (C2S) enable flag upon determining that more than a threshold period of time has elapsed without detecting any missing MAC sequence number in wireless frames or upon determining that more than a threshold number of wireless frames have been received without a missing MAC sequence number; and determining whether to enable or disable transmission of clear-to-send 2 self (C2S) frames from the combo device based on said MAC sequence number.

16. The method of claim 15 further comprising enabling transmission of clear-to-send 2 self (C2S) frames from the combo device based on a determination that a MAC sequence number has been missed.

17. The method of claim 16 further comprising setting an enable flag based on the determination that a MAC sequence number has been missed.

18. The method of claim 15 further comprising disabling clear-to-send 2 self (C2S) frame transmission frames from the combo device based on an enable flag being set and no MAC sequence numbers have been missed for more than a threshold period of time or for more than threshold number of frames.

\* \* \* \* \*